United States Patent
Yasunaga et al.

(10) Patent No.: US 7,477,463 B2
(45) Date of Patent: Jan. 13, 2009

(54) MASTER INFORMATION CARRIER FOR MAGNETIC TRANSFER

(75) Inventors: Tadashi Yasunaga, Odawara (JP); Masakazu Nishikawa, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 577 days.

(21) Appl. No.: 10/770,573

(22) Filed: Feb. 4, 2004

(65) Prior Publication Data
US 2004/0156135 A1 Aug. 12, 2004

(30) Foreign Application Priority Data
Feb. 4, 2003 (JP) ............................. 2003-027095

(51) Int. Cl.
G11B 5/86 (2006.01)
(52) U.S. Cl. .............................. 360/16; 360/15; 360/17; 360/48
(58) Field of Classification Search .................. 360/15, 360/16, 17, 48
See application file for complete search history.

(56) References Cited

U.S. PATENT DOCUMENTS

| | | | | |
|---|---|---|---|---|
| 5,274,623 A * | 12/1993 | Usami et al. | ............. | 369/275.1 |
| 5,939,170 A * | 8/1999 | Nishimori et al. | ............ | 428/141 |
| 5,958,542 A * | 9/1999 | Ootake et al. | ............. | 428/833.5 |
| 6,088,200 A * | 7/2000 | Morita | ......................... | 360/135 |
| 6,164,118 A * | 12/2000 | Suzuki et al. | ................ | 73/1.89 |
| 6,475,599 B1 * | 11/2002 | Saito et al. | .................. | 428/141 |
| 6,567,227 B2 * | 5/2003 | Ishida et al. | .................... | 360/17 |
| 6,606,209 B2 * | 8/2003 | Ishida et al. | .................... | 360/17 |
| 6,636,371 B1 | 10/2003 | Komatsu et al. | | |
| 6,660,364 B2 * | 12/2003 | Yoshida et al. | .............. | 428/141 |
| 6,816,327 B2 * | 11/2004 | Nishikawa et al. | ............ | 360/17 |
| 6,858,328 B1 * | 2/2005 | Ishida et al. | ............. | 428/694 T |
| 6,961,196 B2 * | 11/2005 | Ishida et al. | .................... | 360/16 |
| 7,094,481 B2 * | 8/2006 | Nishikawa et al. | .......... | 428/826 |
| 7,193,796 B2 * | 3/2007 | Yasunaga | ..................... | 360/17 |
| 7,362,528 B2 * | 4/2008 | Moriya et al. | .................. | 360/48 |
| 2001/0028964 A1 * | 10/2001 | Nagao et al. | .......... | 428/694 SG |
| 2002/0051307 A1 * | 5/2002 | Nishikawa et al. | ............ | 360/17 |
| 2002/0051309 A1 * | 5/2002 | Nishikawa et al. | ............ | 360/17 |
| 2002/0098387 A1 | 7/2002 | Tsubata et al. | | |
| 2003/0123170 A1 * | 7/2003 | Miyata et al. | .................. | 360/17 |
| 2003/0179477 A1 | 9/2003 | Usa et al. | | |
| 2004/0107426 A1 * | 6/2004 | Sato et al. | ..................... | 720/618 |
| 2004/0120062 A1 * | 6/2004 | Yip et al. | ....................... | 360/48 |
| 2004/0131893 A1 * | 7/2004 | Sato et al. | ............. | 428/694 TR |
| 2004/0233560 A1 | 11/2004 | Nishikawa | | |

FOREIGN PATENT DOCUMENTS

| | | |
|---|---|---|
| EP | 1 227 472 A2 | 7/2002 |
| EP | 1 347 441 A2 | 9/2003 |
| EP | 1 480 203 A2 | 11/2004 |

* cited by examiner

*Primary Examiner*—Wayne Young
*Assistant Examiner*—Dismery Mercedes
(74) *Attorney, Agent, or Firm*—Sughrue Mion, PLLC

(57) ABSTRACT

A master information carrier has on its surface a signal area where an embossed pattern formed by protruding portions and recessed portions and representing a signal pattern to be transferred has been formed. The shortest bit length of the embossed patter is 300 nm or shorter, and the embossed pattern is formed so that the total of the areas of the upper surfaces of the protruding portions of the embossed pattern is smaller than the total of the areas of inter-protruding-portions in the signal area.

4 Claims, 5 Drawing Sheets

MASTER INFORMATION CARRIER FOR MAGNETIC TRANSFER

BACKGROUND OF THE INVENTION

1. Field of the Invention

This invention relates to a master information carrier for magnetic transfer provided on its surface with an embossed pattern (a pattern of protruding portions and recessed portions) representing information to be transferred to a slave medium such as a magnetic recording medium.

2. Description of the Related Art

As a method of recording a preformat signal such as a servo signal on a slave medium, there is known a magnetic transfer method in which a magnetization pattern representing the signal as an embossed pattern carried by a master information carrier is recorded on or transferred to a magnetic recording layer of the slave medium. See, for instance, U.S. Pat. Nos. 6,567,227, 6,636,371 and U.S. patent Laid-Open No. 20020051307.

In the magnetic transfer, a magnetization pattern representing the information carried by a master information carrier in the form of a fine embossed pattern is magnetically transferred from the master information carrier to a slave medium by applying a transfer magnetic field to the slave medium and the master information carrier in close contact with each other, and accordingly, the information carried by the master information carrier can be statically recorded on the slave medium with the relative position between the master information carrier and the slave medium kept constant. Thus, according to the magnetic transfer, the preformat recording can be performed accurately and the time required for the preformat recording is very short.

The conventional magnetic transfer is developed based on that the shortest bit length is 500 nm to 1 μm. However recent rapid increase in recording density in magnetic recording media, especially in hard disks, further shortens the shortest bit length to the order equal to or less than 100 nm. The shortest bit length in servo signals is normally as long as two to three times that in data areas. Nevertheless, it comes to be necessary to discuss suitability of transfer of the pattern including a bit length on the order of 300 nm or shorter.

SUMMARY OF THE INVENTION

In view of the foregoing observations and descriptions, the primary object of the present invention is to provide a master information carrier for magnetic transfer which can satisfactorily transfer a pattern including a bit length in the order of 300 nm or shorter to a slave medium.

In accordance with the present invention, there is provided a master information carrier having on its surface a signal area where an embossed pattern formed by protruding portions and recessed portions and representing a signal pattern to be transferred has been formed, wherein the improvement comprises that the shortest bit length of the embossed pattern is 300 nm or shorter, and the embossed pattern is formed so that the total of the areas of the upper surfaces of the protruding portions of the embossed pattern is smaller than the total of the areas of inter-protruding-portions in the signal area.

The "inter-protruding-portion" means a portion lower than the protruding portion and the area of the inter-protruding-portion as used herein designates an area of the portion lower than the protruding portion as measured in a plane substantially flush with the upper surface of the protruding portion.

The protruding portions and the recessed portions forming the embossed pattern designate the relatively high portions and the relatively low portions, respectively.

It is preferred that the average height of the upper surfaces of the protruding portions of the embossed pattern, that is the distances between the bottom surfaces of the recessed portions and the upper surfaces of the protruding portions be not smaller than 50 nm. In this case it is further preferred that the dispersion $3\sigma$ (, wherein a designates standard deviation) of the heights of the upper surfaces of the protruding portions be not larger than 10 nm.

The height of the upper surface of a protruding portion is defined as a distance between the average line representing the average height of the upper surface of a protruding portion and the average line representing the average height of the bottom surface of an adjacent recessed portion. The heights can be measured by scanning the surface of the master information carrier by an AFM (atomic force microscope) and the "average line" as used herein means a centerline average line of a scanning profile obtained in each of the protruding portions and the recessed portions. The height of a protruding portion can be determined on the basis of the difference between the average line of the upper surface thereof and the average line of the bottom surface of a recessed portion adjacent to the protruding portion. The average height of the upper surfaces of the protruding portions of the embossed pattern and the dispersion $3\sigma$ of the heights of the upper surfaces of the protruding portions are determined on the basis of data on a plurality of protruding portions.

To obtain data on all the protruding portions on the master information carrier is not practical but to obtain data on a plurality of selected projecting portions is practical. For example, about 10 areas of 10 μm square are selected on the master information carrier and the average height of the upper surfaces of the protruding portions of the embossed pattern and the dispersion $3\sigma$ of the heights of the upper surfaces of the protruding portions are determined on the basis of data on the protruding portions in the selected areas.

The master information carrier may be in various forms. For example, the master information carrier may comprise; only a magnetic substrate having on its surface an embossed pattern; a substrate having on its surface an embossed pattern and a magnetic layer formed at least on the upper surfaces of the protruding portions of the embossed pattern on the substrate; and a flat substrate and a magnetic layer arranged in an embossed pattern on the substrate.

When the master information carrier is provided with a magnetic layer formed on a substrate by a sputtering process, the dispersion of the heights of the upper surfaces of the protruding portions can be controlled by adjusting the sputtering pressure, the sputtering rate and the target/substrate distance in the sputtering parameters. As the sputtering pressure or the sputtering rate is lower, and as the target/substrate distance is longer, the dispersion of the heights of the upper surfaces of the protruding portions tends to be more suppressed.

Further, it is preferred that the upper surfaces of the protruding portions be higher than the surface of the non-signal area (the area outside the signal area). Especially, it is preferred that the height of the upper surfaces of the protruding portions from the surface of the non-signal area be in a range from 50 nm to 800 nm.

As an embossed pattern on the master information carrier for recording the magnetization pattern schematically shown in FIG. 2A on the recording area of the slave medium, there can be conceived two embossed patterns, that is one shown in FIG. 2B and another one shown in FIG. 2C which is a reversed pattern to that shown in FIG. 2B. In the pattern shown in FIG. 2B, the total of the areas of the upper surfaces of the protruding portions of the embossed pattern is smaller than the total of the areas of inter-protruding-portions in the signal area, whereas in the pattern shown in FIG. 2C, the total of the areas of the upper surfaces of the protruding portions of the embossed pattern is larger than the total of the areas of inter-protruding-portions in the signal area. We have discovered that when the shortest bit length is not longer than 300 nm, the embossed pattern shown in FIG. 2B can transfer the information with much higher quality as compared with the embossed pattern shown in FIG. 2C.

That is, the master information carrier of the present invention has on its surface an embossed pattern formed so that the total of the areas of the upper surfaces of the protruding portions of the embossed pattern is smaller than the total of the areas of inter-protruding-portions in the signal area as shown in FIG. 2B. This pattern enables transfer of information represented by the fine embossed pattern where the shortest bit length is not longer than 300 nm at a much higher quality. Further, since the total of the areas of the upper surfaces of the protruding portions of the embossed pattern is smaller than the total of the areas of inter-protruding-portions, the pressure for bringing the slave medium and the master information carrier into close contact with each other can be effectively concentrated, and accordingly, a desired transfer performance can be obtained at a lower contact pressure as compared with a master information carrier having on its surface an embossed pattern as shown in FIG. 2C. That the contact pressure is lower is advantageous in that even when fine dust particles are sandwiched between the slave medium and the master information carrier, damage to the surfaces of the slave medium and the master information carrier can be small.

When the average height of the upper surfaces of the protruding portions of the embossed pattern is not smaller than 50 nm, a sufficient transfer magnetic field can be generated even in a medium having a magnetic recording layer whose coercive force is as high as 3000 Oe (=about 238 kA/m) or greater and accordingly, the information can be transferred with high quality even to a medium having a magnetic recording layer with a high coercive force.

Further, when the dispersion $3\sigma$ of the heights of the upper surfaces of the protruding portions is 10 nm or greater, fluctuation in a reproduction signal can be suppressed at least equivalently to when the magnetization pattern is conventionally recorded with a magnetic head.

Further, when the upper surface of the protruding portion is higher than the surface of the non-signal area by a height not smaller than 50 nm and not larger than 800 nm, the information can be transferred to a medium with high quality preventing signal drop-outs due to adhesion of foreign particles and defective transfer due to deformation of the parts of close contact.

DESCRIPTION OF THE PREFERRED EMBODIMENT

Figure 1:
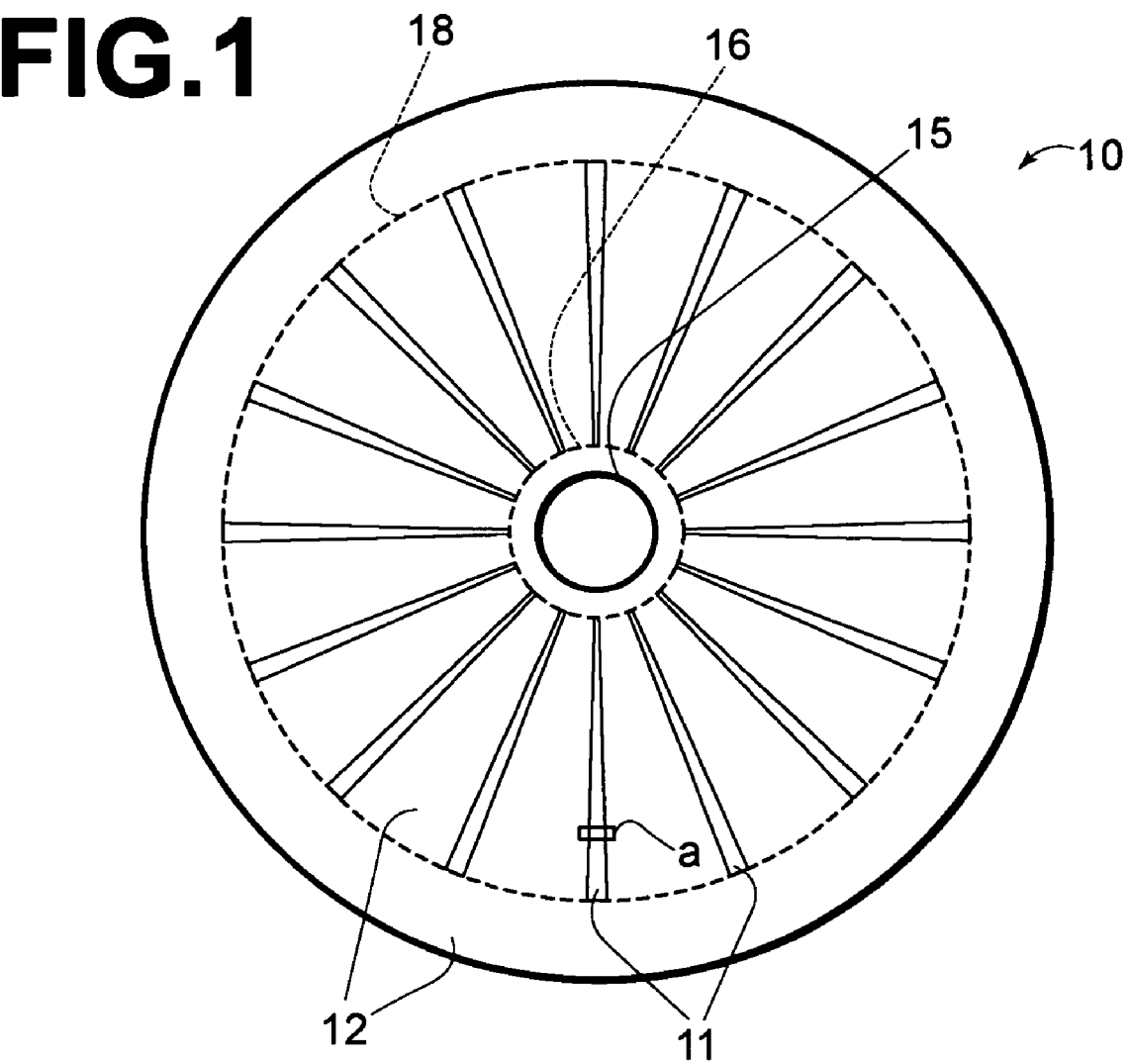
FIG. 1 is a plan view showing a master information carrier in accordance with an embodiment of the present invention.

In FIG. 1, a master information carrier 10 in accordance with an embodiment of the present invention comprises a rigid disk having a central opening. The surface of the master information carrier 10 is partitioned into regularly arranged signal areas 11 and non-signal areas 12 outside the signal areas 11. An embossed pattern representing a servo signal is formed in the signal areas 11.

In the magnetic recording medium (slave medium) transferred with a signal from the master information carrier 10, an area corresponding to a donut-like area of the master information carrier 10 between the innermost and outermost tracks 16 and 18 shown by dotted lines constitutes a signal area and, in the signal area, areas corresponding to the signal areas 11 of the master information carrier 10 constitute servo areas and areas corresponding to the non-signal areas 12 constitute data areas.

Though the master information carrier 10 is for transferring a servo signal in this embodiment, the master information carrier in the present invention can also be for transferring various signals including various types of data other than that of the servo signal.

Figure 2A:
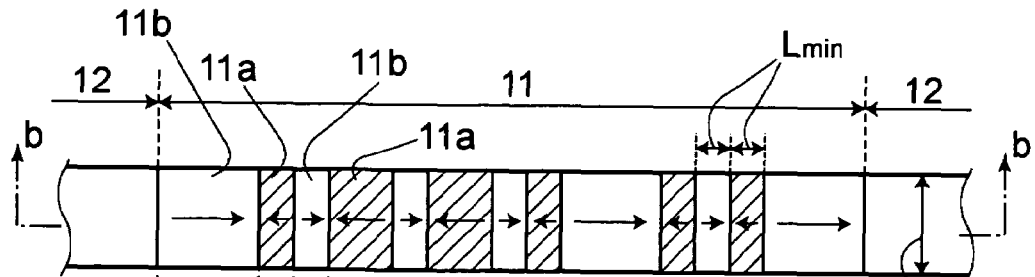
FIG. 2A is a fragmentary enlarged schematic plan view showing a part of the magnetization pattern to be recorded on the slave medium by transfer of the area a of the embossed pattern on the master information carrier shown in FIG. 1.
Figure 2B:
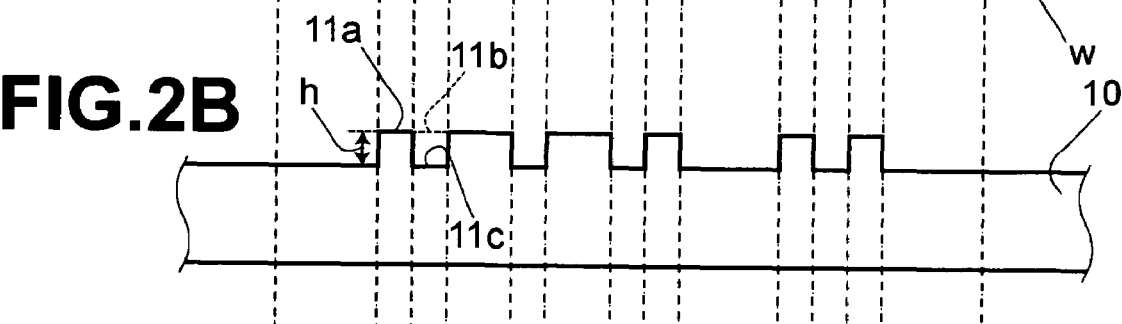
FIG. 2B is a cross-sectional view of a part of the area a of the embossed pattern on the master information carrier shown in FIG. 1 corresponding to a b-b line cross-section in FIG. 2A.
Figure 2C:
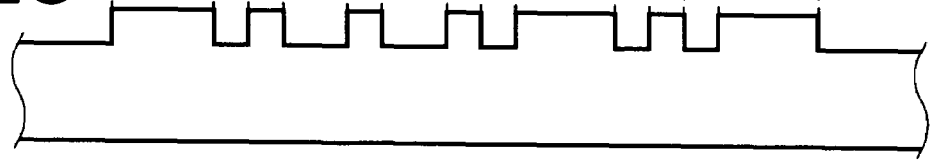
FIG. 2C is a view similar to FIG. 2B but showing the corresponding part of the embossed pattern on the master information carrier not in accordance with the present invention.

FIG. 2A is a fragmentary enlarged schematic plan view showing a part of the magnetization pattern to be recorded on the slave medium by transfer of the area a of the embossed pattern on the master information carrier shown in FIG. 1, FIG. 2B is a cross-sectional view of a part of the area a of the embossed pattern on the master information carrier shown in FIG. 1 corresponding to a b-b line cross-section in FIG. 2A, and FIG. 2C is a view similar to FIG. 2B but showing the corresponding part of the embossed pattern on the master information carrier not in accordance with the present invention.

FIG. 2A shows a part of a track whose width is W, and in FIG. 2A, the magnetization pattern is schematically shown by arrows. Each of the areas in which the arrows are shown corresponds to a bit on the slave medium, and the length of each area as measured in the direction of track is a bit length and the shortest of the bit lengths is the shortest bit length Lmin which is not longer than 300 nm in the master information carrier 10 of this particular embodiment.

The master information carrier 10 of this embodiment has an embossed pattern whose part corresponding to a b-b line cross-section in FIG. 2A is as shown in FIG. 2B.

In the master information carrier 10, the length of the upper surface 11a of each protruding area or the length of the upper opening 11b of each inter-protruding-portion as measured in the direction of track is a bit length. Though the protruding portions are rectangular in cross-section in FIG. 2B, the actual protruding portions are trapezoidal in cross-section. When the protruding portions are trapezoidal in cross-section, that is, when the protruding portions are tapered upward, the recessed portions are flared upward, and the length and the width of the recessed portions are larger when measured along the upper opening 11b thereof than when measured along the bottom surface 11c thereof. Accordingly, in the present invention, the area and the length of the inter-protruding-portions (recessed portions) are as measured in a plane substantially flush with the upper surfaces of the protruding portions. The upper opening 11b of the inter-protruding-portion is on a plane substantially flush with the upper surfaces of the protruding portions.

The magnetization pattern shown in FIG. 2A can be recorded on the slave medium also by the use of a master information carrier having thereon an embossed pattern shown in FIG. 2C. In the pattern shown in FIG. 2B, the areas 11a represented by leftward arrows in FIG. 2A correspond to the upper surfaces of the protruding portions and the areas 11b represented by rightward arrows correspond to the upper opening of the inter-protruding-portions (recessed portions). In the pattern shown in FIG. 2C, the areas 11a represented by leftward arrows in FIG. 2A correspond to the inter-protruding-portions, and the areas 11b represented by rightward arrows correspond to the protruding portions. The total area of the areas 11a is smaller than the total area of the areas 11b. Accordingly, in the pattern shown in FIG. 2B, the total of the areas of the upper surfaces of the protruding-portions of the embossed pattern is smaller than the total of the areas of inter-protruding-portions in the signal area, and in the pattern shown in FIG. 2C, the total of the areas of the upper surfaces of the protruding portions of the embossed pattern is larger than the total of the areas of inter-protruding-portions in the signal area. By selecting the direction of the initial magnetization and/or the transfer magnetic field to be described later, the magnetization pattern shown in FIG. 2A can be transferred to the slave medium by the use of either of the embossed patterns shown in FIGS. 2B and 2C. However, we have discovered that when the shortest bit length is not longer than 300 nm, the embossed pattern shown in FIG. 2B can transfer the information at much higher quality as compared with the embossed pattern shown in FIG. 2C.

When the total of the areas of the upper surfaces 11a of the protruding portions of the embossed pattern is smaller than the total of the areas of inter-protruding-portions 11b as shown in FIG. 2B, the contact pressure for bringing the slave medium and the master information carrier into close contact with each other can be effectively concentrated, and as a result, a desired transfer performance can be obtained at a lower contact pressure as compared with a master information carrier having on its surface an embossed pattern as shown in FIG. 2C. That the contact pressure is lower is advantageous in that even when fine dust particles are sandwiched between the slave medium and the master information carrier, damage to the surfaces of the slave medium and the master information carrier can be small, whereby the service life of the master information carrier can be elongated and at the same time, magnetic recording media having signals transferred thereto can be produced at a high yield.

We have further discovered that when the average height h (FIG. 2B) of the upper surfaces 11b of the protruding portions of the embossed pattern as measured from the bottom surface 11c of the recessed portion is not smaller than 50 nm, the information can be transferred at a high quality even to a medium having a magnetic recording layer of a coercive force as high as 3000 Oe (=about 238 kA/m) or greater, and that when the dispersion 3σ of the heights h is not larger than 10 nm, fluctuation in a reproduction signal can be suppressed at least equivalently to when the magnetization pattern is conventionally recorded on the slave medium by a magnetic head.

Accordingly, it is preferred that the average height h be not smaller than 50 nm and the dispersion 3σ of the heights h be not larger than 10 nm. Though being illustrated as a plane surface in FIG. 2B, the bottom surface 11c of the recessed portion actually has fine projections and/or fine recesses and actually is not a perfect plane surface. Accordingly, the height h is defined to be a height from the average line of the bottom surface obtained by measuring the bottom surface with an AFM.

Figure 3:
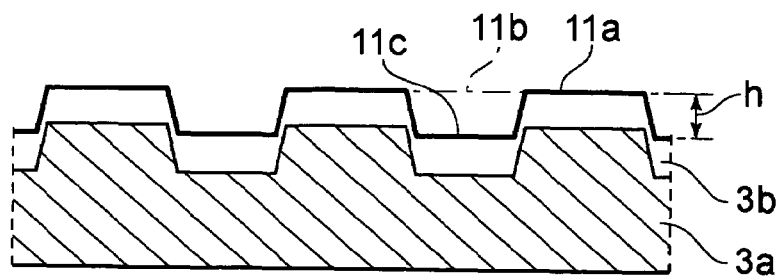
FIG. 3 is a cross-sectional view showing the layer arrangement of the master information carrier.

FIG. 3 is a cross-sectional view showing the layer arrangement of the master information carrier 10. As shown in FIG. 3, the master information carrier 10 comprises a substrate 3a provided on its surface with an embossed pattern and a magnetic layer 3b formed on the substrate 3a along the embossed pattern. It is suitable that the thickness of the magnetic layer 3b is substantially equal to the height of the protruding portions of the embossed pattern.

The substrate 3a of the master information carrier 10 maybe formed, for instance, of, nickel, silicon, glass, quartz, aluminum, alloys, ceramics, synthetic resin or the like. As the magnetic material of the magnetic layer 3b, Co, Co alloys (e.g., CoNi, CoNiZr, or CoNbTaZr), Fe, Fe alloys (e.g., FeCo, FeCoNi, FeNiMo, FeAlSi, FeAl, or FeTaN), Ni or Ni alloys (e.g., NiFe) can be employed. FeCo and FeCoNi are especially preferred. Although the magnetic layer 3b may be made of any one of a soft magnetic material, a semi-hard magnetic material and a hard magnetic material, the soft magnetic material and the semi-hard magnetic material which have relatively small coercive force are preferred as the magnetic layer 3b since they can transfer information with high quality.

The embossed pattern or the pattern of the protruding portions and the recessed portions can be formed, for instance, by the use of a stamper process or a photolithography process.

An example of production of the master information carrier will be described, hereinbelow. A photoresist solution is applied to a disc of glass or quartz having a smooth surface by spin coating, thereby forming a photoresist layer. Thereafter, a laser beam (or an electron beam) modulated according to the servo signal to be transferred is caused to scan the disc with the photoresist layer, while rotating the disc, to expose the photoresist layer over the entire area thereof along the tracks in a predetermined pattern, e.g., a pattern corresponding to a servo signal comprising a plurality of linear parts radially extending from the center of rotation. Then, the photoresist layer is developed and is removed from the areas exposed to the beam, whereby an original carrying thereon an irregular pattern of the photoresist is obtained. Plating (electroforming) is applied to the original after a predetermined conducting treatment and a nickel substrate having a positive irregular pattern following the original is obtained. Thereafter, the nickel substrate is peeled off the original.

Otherwise, an original may be obtained by etching the disc after the disc is provided with a pattern of photoresist to form holes through the disc and removing the photoresist. Thereafter, a substrate can be obtained from the original in the same manner as described above.

The substrate may be formed of metal such as Ni or Ni alloys. The metal substrate may be formed by various metal film forming techniques including electroless plating, electroforming, sputtering, and ion plating. When the embossed pattern represents a sample servo signal, it is preferred that the protruding portions are of rectangles which are longer in the radial direction than in the circumferential direction. The lengths in the radial direction and the circumferential direction are preferably in the ranges of 0.05 to 20 μm and 0.05 to 5 μm, respectively.

The magnetic layer may be formed along the embossed pattern using a magnetic material by vacuum coating techniques such as sputtering or ion plating or by plating or the like. The thickness of the magnetic layer is preferably 50 nm to 500 nm, and more preferably 80 nm to 300 nm.

It is preferable to provide a 5 to 30 nm thick protective layer such as a DLC (diamond-like carbon) coating on the magnetic layer. A lubricant layer may be further provided. A reinforcement layer such as a Si layer may be provided between the magnetic layer and the protective layer to enhance the contact therebetween. The lubricant layer suppresses deterioration in durability of the master information carrier, such as scores due to friction, which occurs in correcting for a shift generated when the master information carrier is brought into contact with the slave medium.

The fluctuation (dispersion) in the heights h of the upper surfaces 11a of the protruding portions is mainly generated in the mastering step for forming the embossed pattern and the magnetic layer forming step. In the mastering step, unevenness in the thickness of the resist layer, unevenness in the conditions of exposure and the like form a factor in fluctuation in the heights h of the upper surfaces 11a of the protruding portions. The fluctuation in the heights h of the upper surfaces 11a of the protruding portions generated in the magnetic layer forming step can be controlled by adjusting, for instance, sputtering conditions. For example, as the sputtering pressure or the sputtering-rate is lower, and as the target/substrate distance is longer, the fluctuation of the heights of the upper surfaces of the protruding portions can be more suppressed.

Basic steps of magnetic transfer to an in-plane magnetic recording medium (slave medium) 2 comprising a base sheet 2a and a magnetic layer 2b formed on the base sheet 2a will be described with reference to FIGS. 4A to 4C, hereinbelow.

Figure 4A:
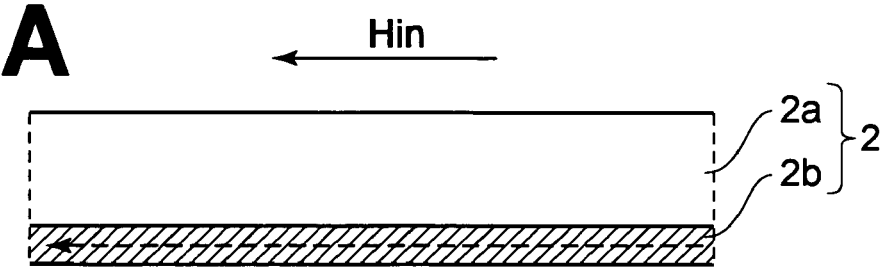
FIGS. 4A to 4C are schematic views for illustrating basic steps of magnetic transfer.
Figure 4B:
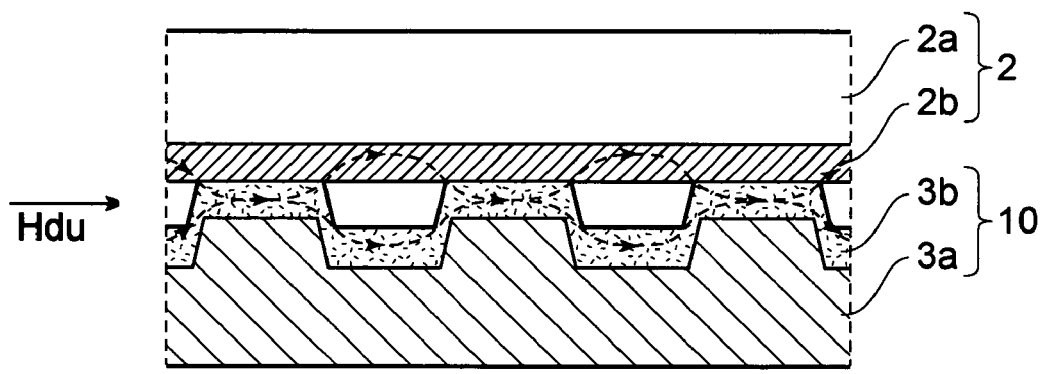
Figure 4C:

An initial DC magnetic field Hin is first applied to the slave medium 2 in one direction parallel to the recording tracks thereof, thereby magnetizing the magnetic layer 2b of the slave medium 2 in an initial DC magnetization as shown in FIG. 4A. Thereafter, the magnetic layer 3b of the surfaces of the protrusions on the surface the master information carrier 10 is brought into close contact with the magnetic layer 2b of the slave medium 2. In this state, a transfer magnetic field Hdu is applied in the direction opposite to the initial DC magnetic field Hin as shown in FIG. 4B, thereby magnetically transferring the information on the master information carrier 10 to the slave medium 2. As a result, information (e.g., a servo signal) represented by the embossed pattern on the master information carrier 10 is magnetically transferred to and recorded on the magnetic layer 2b of the slave medium 2 as shown in FIG. 4C. Though, in the description above, the slave medium 2 has the magnetic layer 2b only on one side thereof, the slave medium 2 may have the magnetic layer on both the sides thereof. When the slave medium 2 has the magnetic layer on both the sides thereof, the information represented by the embossed patterns on a pair of master information carriers may be transferred to the sides of the slave medium 2 either simultaneously or in sequence.

The intensities of the initial magnetic field and the transfer magnetic field should be determined taking into account the coercive force of the slave medium 2, the specific permeabilities of the magnetic layers of the master information carrier and the slave medium.

A magnetic recording disc such as a hard disc or a high-density flexible disc is generally employed as the slave medium 2. The magnetic layer provided on a non-magnetic substrate is generally of a particulate magnetic layer or a thin metal magnetic layer.

In the case of a slave medium having a magnetic layer of thin metal magnetic layer, the material of the magnetic layer maybe Co, Co alloy (e.g., CoPtCr, CoCr, CoPtCrTa, CoPtCrNbTa, CoCrB, CoNi, Co/Pd), Fe or Fe alloy (e.g., FeCo, FePt, FeCoNi). In view of obtaining clearer magnetic transfer, it is preferred that the magnetic layer has high magnetic flux density and magnetic anisotropy in the in-plane direction (in the case of in-plane recording) or in the perpendicular direction (in the case of perpendicular recording). The thickness of the magnetic layer is preferably not smaller than 10 nm and not larger than 500 nm, and more preferably not smaller than 20 nm and not larger than 200 nm.

It is possible that the magnetic layer is provided with a non-magnetic primer layer therebelow (on the base sheet side thereof) in order to give the magnetic layer necessary magnetic anisotropy. Though, Cr, CrTi, CoCr, CrTa, CrMo, NiAl, Ru or the like may be employed as the non-magnetic primer layer, the primer layer should match to the magnetic layer in crystallographic structure and lattice constant. The thickness of the non-magnetic layer is preferably not smaller than 10 nm and not larger than 150 nm and more preferably not smaller than 20 nm and not larger than 80 nm.

Though the magnetic transfer to an in-plane magnetic recording medium (slave medium) has been described above, the present invention can also be applied to a perpendicular magnetic recording medium to obtain substantially the same result.

The master information carrier of the present invention need not be limited to those described above so long as the embossed pattern on the substrate thereof is formed so that the total of the areas of the upper surfaces of, the protruding portions of the embossed pattern is smaller than the total of the areas of inter-protruding-portions in the signal area, and may be in various forms. For example, the master information carrier may comprise; only a magnetic substrate having on its surface an embossed pattern; a substrate having on its surface an embossed pattern and a magnetic layer formed at least on the upper surfaces of the protruding portions of the embossed pattern on the substrate; and a flat substrate and a magnetic layer arranged in an embossed pattern on the substrate. Examples of such master information carriers are shown in FIGS. 5A to 5D.

Figure 5A:
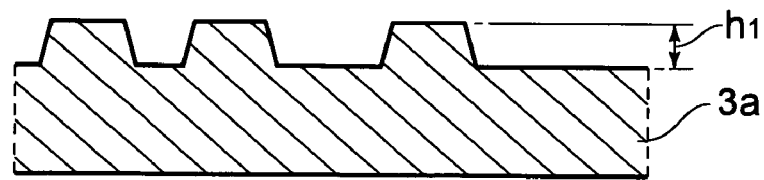
FIGS. 5A to 5D are cross-sectional views respectively showing master information carriers in accordance with other embodiments of the present invention.

The master information carrier shown in FIG. 5A comprises only a substrate 3a formed of ferromagnetic material such as Ni. The surface of the substrate 3a is embossed in a pattern representing the information to be transferred. In the case of this master information carrier, the height of the protruding portion of the embossed pattern (the height of the upper surface of a protruding portion as measured from the bottom surface of the recessed portion) is the distance h1 between the bottom surface of the recessed portion of the substrate and the upper surface of the protruding portion of the substrate.

Figure 5B:
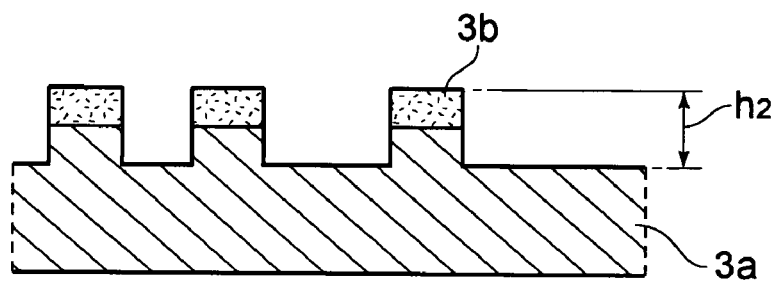

The master information carrier shown in FIG. 5B comprises a substrate 3a having on its surface an embossed pattern and a magnetic layer 3b formed only on the upper surfaces of the protruding portions of the embossed pattern on the substrate. In the case of this master information carrier, the height of the protruding portion of the embossed pattern is the distance h2 between the bottom surface of the recessed portion of the substrate 3a and the upper surface of the magnetic layer on the protruding portion of the substrate 3a.

Figure 5C:
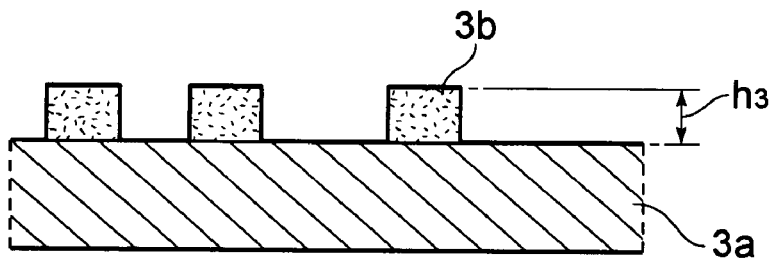

The master information carrier shown in FIG. 5C comprises a flat substrate 3a provided with a magnetic layer 3b arranged in an embossed pattern. In the case of this master information carrier, the height of the protruding portion of the embossed pattern is the distance h3 between the bottom surface of the recessed portion of the substrate 3a and the upper surface of the magnetic layer 3b on the substrate 3a.

Figure 5D:
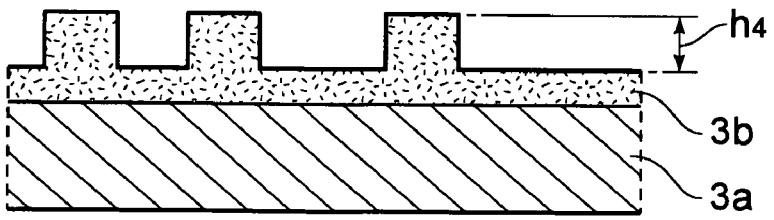

The master information carrier shown in FIG. 5D comprises a flat substrate 3a and a magnetic layer 3b having on its surface an embossed pattern and provided on a surface of the flat substrate 3a. In the case of this master information carrier, the height of the protruding portion of the embossed pattern is the distance h4 between the bottom surface of the recessed portion of the magnetic layer 3b and the upper surface of the protruding portion on the magnetic layer 3b.

The present invention can be applied to any one of the master information carriers shown in FIGS. 5A to 5D to obtain substantially the same result.

Figure 6A:
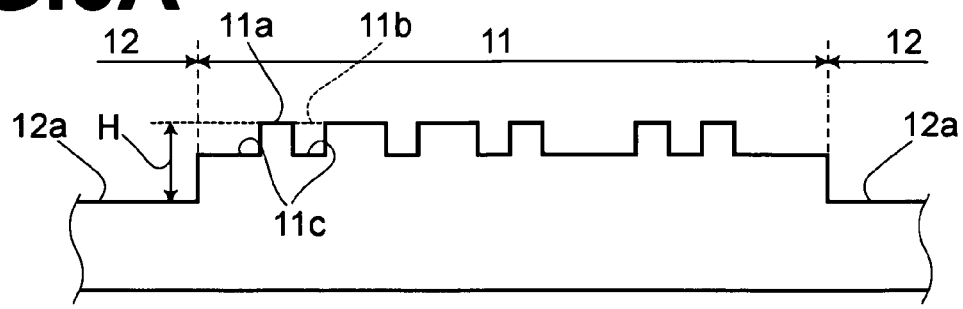
FIGS. 6A and 6B are cross-sectional views respectively showing master information carriers in accordance with still other embodiments of the present invention.
Figure 6B:
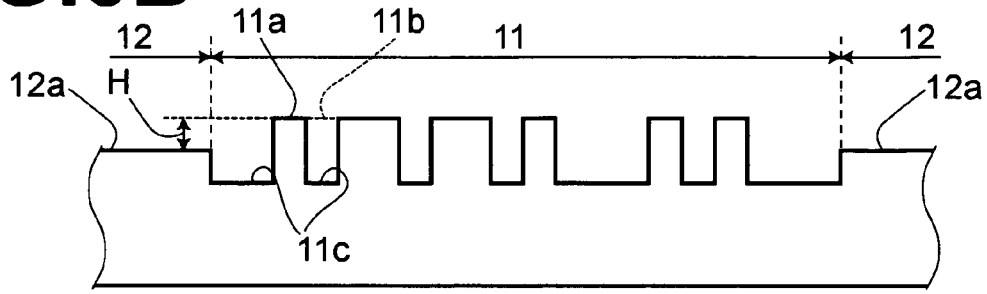

It is preferred that the upper surface of the protruding portion be higher than the surface of the non-signal area 12 (FIG. 1) by a height not smaller than 50 nm and not larger than 800 nm. FIGS. 6A and 6B respectively show more preferred embodiments of the present invention, and correspond to the cross-sectional view shown in FIG. 2B. As shown in FIG. 6A, the height H of the upper surface 11a of the protruding portion in the signal area 11 from the surface 12a of the non-signal area 12 is preferably not smaller than 50 nm and not larger than 800 nm. When the upper surface 11a of the protruding portion is higher than the surface of the non-signal area 12, the pressure for bringing the slave medium and the master information carrier into close contact with each other can be more effectively concentrated on the protruding portions, and accordingly, the contact pressure can be lowered. That the contact pressure is lower is advantageous in that even when fine dust particles are sandwiched between the slave medium and the master information carrier, damage to the surfaces of the slave medium and the master information carrier can be small. When the height H is smaller than 50 nm, foreign particles entrapped between the master information carrier and the slave medium can cause defect in contact of the signal areas, which often results in signal drop-outs. When the height H is larger than 800 nm, the difference in height between the signal area and the non-signal area becomes excessively large, which can result in excessively large deformation of the master information carrier and defective transfer. Accordingly, it is preferred that the height H be not smaller than 50 nm and not larger than 800 nm.

That the bottom surface 11c of the recessed portions is lower than the surface 12a of the non-signal area 12 as shown in FIG. 6B causes no problem so long as the upper surface 11a of the protruding portions is higher than the surface 12a of the non-signal area 12 and the difference H therebetween is in the range described above.

Three evaluative experiments were carried out on concrete examples. In each experiment, a plurality of master information carriers were produced under different conditions, and the information carried by each master information carrier was transferred to a slave medium, and the transfer properties of each master information carrier were evaluated on the basis of the reproduction signal from the slave medium.

The following was common to all the experiments.

Figure 7A:
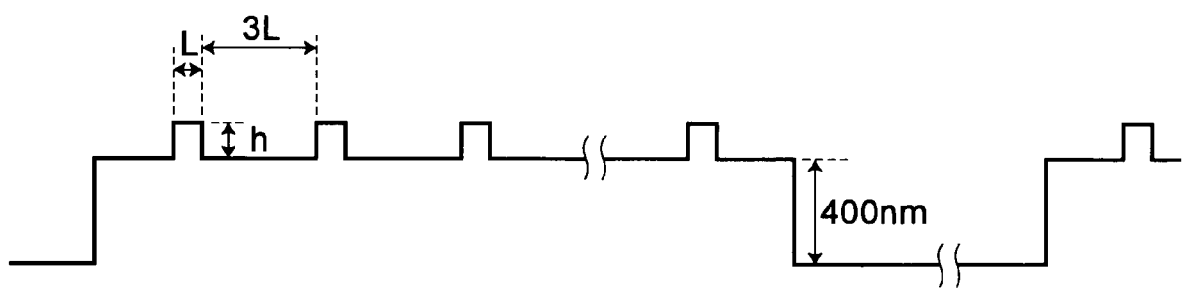
FIGS. 7A and 7B are cross-sectional views respectively showing the master information carriers used in the experiments of evaluation.
Figure 7B:
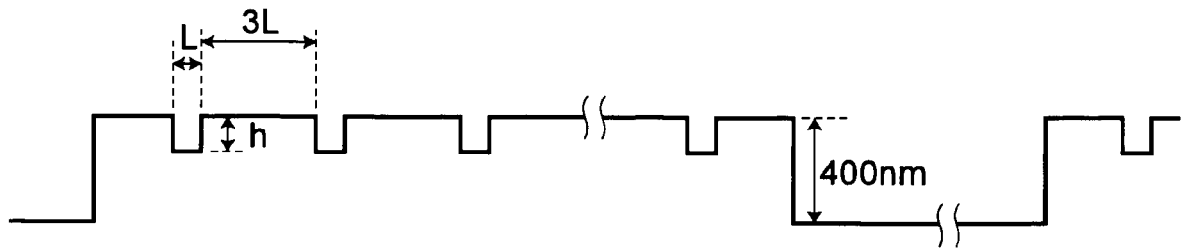

Each master information carrier had a Ni substrate formed by a stamper process. The Ni substrate had an embossed pattern having a cross-section shown in FIG. 7A or 7B. FIGS. 7A and 7B are cross-sectional views taken in the direction of the track. In the embossed patterns shown in FIGS. 7A and 7B, the shortest bit length is represented by L and the height of the protruding portions is represented by h. In the embossed pattern shown in FIG. 7A, the difference in height between the bottom surface of the recessed portion in the signal area and the surface of the non-signal area is 400 nm. In the embossed pattern shown in FIG. 7B, the difference in height between the upper surface of the protruding portion in the signal area and the surface of the non-signal area is 400 nm. Further, in the embossed pattern shown in FIG. 7A, the embossed pattern is formed so that the total of the areas of the upper surfaces of the protruding portions of the embossed pattern is smaller than the total of the areas of inter-protruding-portions in the signal area. In the embossed pattern shown in FIG. 7B, the embossed pattern is formed so that the total of the areas of the upper surfaces of the protruding portions of the embossed pattern is larger than the total of the areas of inter-protruding-portions in the signal area. The embossed patterns shown in FIGS. 7A and 7B will be respectively referred to as "the pattern (a)" and "the pattern (b)", hereinbelow.

The number of bits per one sector was 80 and the track width was 5 µm. Patterns whose shortest bit length was 100 nm to 200 nm was drawn by the use of an EB (electron beam) drawing system and patterns whose shortest bit length was 500 nm to 1 µm was drawn by the use of a laser beam drawing system.

A magnetic layer of $Fe_{70}Co_{30}$ was formed on the Ni substrate in a predetermined thickness under the sputtering conditions described later, thereby producing a master information carrier.

The magnetic transfer was carried out in the manner described above in conjunction with the embodiment of the present invention. The contact pressure applied to the master information carrier was selected to a minimum of pressures in the range where the reproduction output from the slave medium was kept not lower than a predetermined level and the amplitude of the reproduction signal cannot be increased even if a contact pressure larger than the range was applied.

Hard disks which were formed by providing a magnetic layer and a primer layer respectively of CoCrPt and CrTi on a 2.5 inch glass plate and had coercive forces Hc of 3200 Oe (=about 255 kA/m) in its coercive force were used as the slave media.

Reproduction signal bit strings output from each of the slave media which had been transferred with the signal from the master information carriers were taken in a digital oscilloscope by the use of a remodeled type Spin Stand SS-60 (Kyodo Denshi System Co.) and a GMR head which was 0.4 µm in read track width and 0.12 µm in gap between shields, and an average amplitude in the positive sector Pos. and an average amplitude in the negative sector Neg. were obtained.

Each evaluative experiment will be described, hereinbelow.

<Experiment 1>

Master information carriers having embossed patterns of the pattern (a) and the pattern (b) with the height h of the protruding portions of 100 nm and the magnetic layer of $Fe_{70}Co_{30}$ in a thickness of 100 nm under the following sputtering conditions were made. The shortest bit lengths L in the master information carrier were 100 nm, 200 nm, 500 nm and 1 µm. The sputtering pressure was $1.4 \times 10^{-1}$ pa and the sputtering input power was 2.8 W/cm². The value of [Pos./(Pos.+Neg.)]×100 (%) was calculated for each of the master information carriers. When the value was not smaller than 40% and not larger than 60%, the master information carrier was evaluated to be good (○), when the value was not smaller than 30% and smaller than 40% or larger than 60% and not larger than 70%, the master information carrier was evaluated to be acceptable (Δ), and when the value was smaller than 30% and larger than 70%, the master information carrier was evaluated to be bad (×). The result was as shown in the following table 1.

TABLE 1

|  | Shortest bit length | | | |
|---|---|---|---|---|
|  | 100 nm | 200 nm | 500 nm | 1 μm |
| pattern (a) | ○ | ○ | ○ | ○ |
| pattern (b) | X | Δ | ○ | ○ |

As can be understood from table 1, the evaluations were good (○) for both the master information carriers carrying thereon embossed patterns of the patterns (a) and (b) so long as the shortest bit length was 500 nm or 1 μm. However the evaluations were acceptable (Δ) or bad (×) for the master information carriers carrying thereon embossed patterns of the pattern (b) in the case that the shortest bit length was 200 nm or 100 nm. On the other hand, the evaluations for the master information carriers carrying thereon embossed patterns of the pattern (a) were good (○) irrespective of the shortest bit length. Further, irrespective of the shortest bit length, the master information carriers carrying thereon embossed patterns of the pattern (b) required a contact pressure as high as two to three times that required by the master information carriers carrying thereon embossed patterns of the pattern (a).

<Experiment 2>

Master information carriers having embossed patterns of the pattern (a) with the height h of the protruding portions of 40 nm, 75 nm and 100 nm and the magnetic layer of $Fe_{70}Co_{30}$ in a thickness equal to the height h of the protruding portions were made. The shortest bit lengths L in the master information carrier were 100 nm, 200 nm, and 500 nm. The value of (Pos.+Neg.)/2 was calculated for each of the master information carriers. The result was as shown in the following table 2. Since reproduction signal level depends upon the bit length due to the reproducing head gap loss, the values are relative values with the values for the master information carrier where the average height of the protruding portions are 100 nm taken as 0 dB. Further, the measuring accuracy for the shortest bit length of 100 nm is somewhat inferior to that for the other two cases.

TABLE 2

| Shortest bit length | 40 nm (average h) | 75 nm (average h) | 100 nm (average h) |
|---|---|---|---|
| 100 nm | −7 dB | −1 dB | 0 dB |
| 200 nm | −6 dB | −0.5 dB | 0 dB |
| 500 nm | −6 dB | −0.5 dB | 0 dB |

As can be understood from table 2, the values were −1 dB or so when the embossed patterns on the master information carriers were 75 nm in average heights h irrespective of the shortest bit length. However the values were −6 to −7 dB when the embossed patterns on the master information carriers were 40 nm in average heights h irrespective of the shortest bit length. This proves that there is a tendency the higher the average heights h is, the higher the quality of the obtained signal is.

<Experiment 3>

Master information carriers having embossed patterns of the pattern (a) with the height h of the protruding portions of 40 nm, 75 nm and 100 nm and the magnetic layer of $Fe_{70}Co_{30}$ in a thickness equal to the height h of the protruding portions were made. The dispersion 3σ of the heights of the protruding portions was controlled by changing the sputtering conditions (the sputtering pressure, the target/substrate distance and the making power) of the magnetic layer as shown in the following table 3.

TABLE 3

| 3 σ | sputtering pressure (Pa) | power (W/cm²) | target/substrate distance (mm) |
|---|---|---|---|
| 4 nm | $1.4 \times 10^{-1}$ | 1.4 | 150 |
| 7 nm | $1.4 \times 10^{-1}$ | 2.8 | 100 |
| 9 nm | $1.9 \times 10^{-1}$ | 2.8 | 100 |
| 20 nm | $1.9 \times 10^{-1}$ | 3.5 | 50 |

Fluctuations in pulse height (Pos.(max value)-Pos.(min value))/Pos.)×100 (%) were calculated bit by bit of the positive side for the respective master information carriers. When the value was smaller than 10%, the master information carrier was evaluated to be good (○), when the value was not smaller than 10% and not larger than 30%, the master information carrier was evaluated to be acceptable (Δ), and when the value was larger than 30%, the master information carrier was evaluated to be bad (×). The result was as shown in the following table 4.

TABLE 4

| shortest bit length | 4 nm (3 σ) | 7 nm (3 σ) | 9 nm (3 σ) | 20 nm (3 σ) |
|---|---|---|---|---|
| 100 nm | ○ | ○ | ○ | X |
| 200 nm | ○ | ○ | ○ | Δ |
| 500 nm | ○ | ○ | ○ | Δ |

As can be understood from table 4, the evaluations were good (○) for all the master information carriers where the value of 3σ was not larger than 9 nm irrespective of the shortest bit length. To the contrast, the evaluations were acceptable (Δ) or bad (×) for the master information carriers where the value of 3σ was 20 nm.

What is claimed is:

1. A master information carrier having on its surface a signal area where an embossed pattern formed by protruding portions and recessed portions and representing a signal pattern to be transferred has been formed, wherein the improvement comprises that the shortest bit length of the embossed pattern is 300 nm or shorter, and the embossed pattern is formed so that a total of areas of upper surfaces of the protruding portions of the embossed pattern is smaller than a total of areas of inter-protruding-portions in the signal area, wherein the signal area in which the embossed pattern has been formed and a non-signal area in which there is no embossed pattern are present on the surface of the master information carrier, an average height of the upper surfaces of the protruding portions of the embossed pattern is not smaller than 50 nm, and dispersion 3σ of heights of the upper surfaces of the protruding portions is not larger than 10 nm.

2. The master information carrier as defined in claim 1, wherein the upper surfaces of the protruding portions are higher than a surface of a non-signal area by a height in a range from 500 nm to 800 nm.

3. A method for producing a magnetic disk which carries information represented by a signal pattern, comprising the steps of:initial-magnetizing a magnetic recording layer by applying a magnetic field in a predetermined direction to a disk-shaped slave medium having the magnetic recording layer at least on a surface of a non-magnetic substrate; and magnetically transferring information by applying a magnetic field in an approximately opposite direction to the direction in initial-magnetizing while the magnetic recording layer on the slave medium, which has been initial-magnetized and a surface of a disk-shaped master information carrier which carries the signal patter to be transferred are placed in close contact with each other, wherein the disk-shaped master information carrier has a signal area in which an embossed pattern representing the signal pattern to be transferred has been formed on the surface of the disk-shaped master information carrier, wherein a shortest bit length of the embossed pattern in a direction of track is 300 nm or less, wherein a total of areas of upper surfaces of protruding portions of the embossed pattern is less than 50% of a total of the signal area, wherein the signal area in which the embossed pattern has been formed and a non-signal area in which there is no embossed pattern are present on the surface of the master information carrier, an average height of the upper surfaces of the protruding portions of the embossed pattern is not smaller than 50 nm, and dispersion 3 σ of heights of the upper surfaces of the protruding portions is not larger than 10 nm.

4. The method for producing a magnetic disk, as defined in claim 3, wherein the signal pattern to be transferred is a servo signal.

* * * * *